(12) United States Patent
Autz (10) Patent No.: US 6,416,051 B1
(45) Date of Patent: Jul. 9, 2002

(54) SHEET GUIDING DEVICE AND METHOD OF PRODUCTION

(75) Inventor: Helmut Autz, Heidelberg (DE)

(73) Assignee: Heidelberger Druckmaschinen, Heidelberg (DE)

( * ) Notice: Subject to any disclaimer, the term of this patent is extended or adjusted under 35 U.S.C. 154(b) by 0 days.

(21) Appl. No.: 09/658,709

(22) Filed: Sep. 11, 2000

Related U.S. Application Data (63) Continuation of application No. PCT/EP99/01605, filed on Mar. 11, 1999.

(30) Foreign Application Priority Data

Mar. 11, 1998 (DE) .......................................... 198 10 387

(51) Int. Cl.⁷ .............................................. B65H 29/24
(52) U.S. Cl. ........................ 271/195; 271/264; 406/86; 219/121.63; 219/121.64; 29/890.039
(58) Field of Search ................................ 271/264, 195, 271/204; 406/86; 29/DIG. 39, 890.039; 428/582, 544; 34/618; 219/121.63, 121.64; 156/272.6

(56) References Cited

U.S. PATENT DOCUMENTS

| 4,320,281 A | * | 3/1982 | Cruickshank et al. .. | 219/121.64 |
| 4,833,295 A | * | 5/1989 | Locker et al. ......... | 219/121.63 |
| 5,299,965 A | * | 4/1994 | Lee ........................ | 219/121.64 |
| 5,676,865 A | * | 10/1997 | Chang ................... | 219/121.64 |
| 5,749,414 A | * | 5/1998 | Damsohn et al. ...... | 219/121.64 |
| 5,988,633 A | * | 11/1999 | Henn et al. .................. | 271/195 |
| 5,992,845 A | * | 11/1999 | Fendler et al. .............. | 271/195 |

FOREIGN PATENT DOCUMENTS

| DE | 34 07 770 C2 | | 9/1985 |
| DE | 42 09 067 A1 | | 9/1993 |
| DE | 94 18 358.9 | * | 4/1995 |
| DE | 44 06 847 A1 | | 9/1995 |
| DE | 196 02 514 C1 | | 4/1997 |
| EP | 0 725 025 A2 | | 8/1996 |

OTHER PUBLICATIONS

German Utility Model G 94 18 358.9, dated Apr. 6, 1995, sheet guiding device.

* cited by examiner

*Primary Examiner*—H. Grant Skaggs
(74) *Attorney, Agent, or Firm*—Laurence A. Greenberg; Werner H. Stemer; Gregory L. Mayback (57) ABSTRACT

A sheet guiding device having a top plate formed with a smooth side facing towards sheets to be guided past the device, includes at least one depression defining at least one connecting region, the at least one depression being formed in the top plate from the smooth side thereof, and at least one rear element fastened to a rear side of the top plate and having at least one connecting portion assigned to the at least one connecting region, the at least one rear element bearing against the top plate and being connected thereto by laser weld seams forming a connection to the top plate at the at least one connecting region defined by the at least one depression, the at least one depression formed in the top plate being deeper than any deformation induced by the laser weld seams; and method of producing the device.

26 Claims, 6 Drawing Sheets

SHEET GUIDING DEVICE AND METHOD OF PRODUCTION

CROSS-REFERENCE TO RELATED APPLICATION

This is a continuation of copending International Application PCT/EP99/01605, filed Mar. 11, 1999, which designated the United States.

BACKGROUND OF THE INVENTION

1. Field of the Invention

The invention relates to a sheet guiding device, in particular for contact-free guidance of printed paper sheets in or in connection with printing machines, for example, in a dryer connected to a printing machine, and a method of producing the sheet guiding device.

In sheet-fed offset printing, particularly multi-color printing, printing inks and dispersion coatings are frequently used, which require a given length of time and amount of light radiation, i.e., infrared (IR) and ultraviolet (UV) as well as heat possibly for the drying thereof. Correspondingly, not yet smudge-proof printed sheets or dispersion varnishes must be handled without damaging the fresh print. The sheets must run without smearing. The drying of the printing inks is frequently accelerated by heat. Serving for this purpose are dryers, which are provided with infrared radiators or UV-radiators of relatively high output, for example, up to 30 kW. Modern sheet-fed offset printing machines are capable of printing up to 21,000 sheets per hour, each sheet being able to have a maximum length of 1 m. This results in a very high production speed and running speed of the sheets and a very short dwell time in the dryer, which, in turn, results in the high required dryer outputs. The high thermal outputs cannot, however, be completely absorbed by the sheets. Part of the heat virtually unavoidably affects guide plates which are arranged opposite the infrared or UV-radiator for guiding the sheets in the dryer. Heat effects must, however, be kept away from the printing machine in order to avoid any impairment of the proper function thereof. An attempt has therefore been made to provide the guide plates with water cooling for carrying excess heat away.

In this regard, the published German Patent Document DE 196 02 514 C1 discloses a guiding device with a cooled guide plate which is connected to coolant channels at the rear side opposite from the guide face. For this purpose, a cooling trough plate is fastened onto the rear side of the guide plate by spot welding or pulse welding and is sealed off from the guide plate by a sealing element, such as a flexible or soft rubber ring.

Overheating resulting from applied radiation can cause the sealing rings to shrink, and the connections between the guide plate and the cooling trough plate to leak.

From the published German Utility Patent Document G 9418358 U1, it has also become known heretofore to use, as a guiding device, a guide plate having a further guide plate welded onto a rear side thereof by a laser welding method. In this regard, the plates are selected with different thicknesses. If the enclosed intermediate space is filled with compressed air, the thinner guiding plate is to be plastically (permanently) deformed, the thinner plate being provided with a curvature, and consequently a hollow body being formed, which then serves as a guiding device.

A method for producing hollow bodies with pre-shaped plate parts is disclosed, for example, in the published German Patent Document DE 34 07 770 C2. This method serves for producing fuel tanks from plate half-shells having like plate thickness. Both plate half-shells are provided with a peripheral flange-like border. The borders are welded by the laser welding method. It is essential that this weld seam be gastight, in order to prevent fuel from escaping. To achieve this, it is necessary, in the course of the laser welding operation, to build up a high contact pressure between the plate parts which are involved. For this purpose, in the region of the weld seam that is to be formed, the flange of one half shell is provided with a bead, which appears as a projection with respect to the half shell lying opposite thereto. In this regard, the bead has a depth corresponding approximately to the plate thickness and the width of the weld seam later to be formed. A pressing force between the half-shells is transferred completely by the bead, so that, during welding, a concentration of force and, consequently, an intimate material bonding occurs here, i.e., in the region of the weld seam to be formed. To make the surface pressure in the region of the bead as great as possible, the bead must be formed as narrow as possible, i.e., not wider than the laser beam. Consequently, the desired virtually linear contact between the parts to be welded is achieved.

In the case of guiding devices for printed sheets, however, it is not a matter of obtaining a gastight connection which, if need be, can withstand a crash, as in the case of a fuel tank, but rather, as good a surface as possible, which is provided for guiding printed sheets. In particular, in the case of printing machines which print sheets on both sides thereof, for example, on one side by first-form or recto printing, and on the other side, facing the guide plate, by perfector or verso printing, or on both sides by first-form or recto printing, what matters is guiding the sheet as far as possible without any contact. Therefore, as heretofore known in practice, the corresponding sheet guiding devices can be guided by sheet guiding members, so-called sheet guiding plates having air nozzles. The latter produce an air cushion on and along which the printed sheet is guided.

The published German Patent Document DE 44 27 448 A1 discloses a sheet guiding plate of this type, the guiding face of which has openings into which air blowing nozzles are inserted flush with the surface of the guiding face and adhesively secured or cemented therein. The air blowing nozzles are arranged so that the air flow formed over the surface is determined by a first velocity component in the direction of movement of the sheet and two further velocity components in the direction of the two side edges of the path of movement. Consequently, contact-free guidance of the sheet is assured.

In the guidance of the sheet, what matters is that the sheet slides so securely or reliably on the air cushion, even at high transporting speeds, as to avoid damage to a print on the side of the sheet facing the guide plate. In addition, the sheets are to be guided through the dryer at a speed corresponding to the output of the printing machine, which requires correspondingly high dryer outputs and, as a consequence, correspondingly high cooling capacities at the sheet guiding device.

SUMMARY OF THE INVENTION

Starting from the foregoing state of the art, it is accordingly an object of the invention to provide a sheet guiding device for guiding sheets which have been printed on both sides thereof, without causing any damaging thereto.

With the foregoing and other objects in view, there is provided, in accordance with one aspect of the invention, a sheet guiding device having a top plate formed with a smooth side facing towards sheets to be guided past the device, comprising at least one depression defining at least one connecting region, the at least one depression being formed in the top plate from the smooth side thereof, and at least one rear element fastened to a rear side of the top plate and having at least one connecting portion assigned to the at least one connecting region, the at least one rear element bearing against the top plate and being connected thereto by laser weld seams forming a connection to the top plate at the at least one connecting region defined by the at least one depression, the at least one depression formed in the top plate being deeper than any deformation induced by the laser weld seams.

In accordance with another feature of the invention, the at least one rear element is a further plate whereon the at least one connecting portion assigned to the at least one connecting region is formed, and a fluid chamber formed between the top plate and the further plate is included, and is accessible via at least another connection.

In accordance with a further feature of the invention, the fluid chamber is a coolant chamber having an inlet connection and an outlet connection and, therefrom, the top plate being, from the rear side thereof, in direct heat exchange with the coolant.

In accordance with an added feature of the invention, the fluid chamber is an air chamber, and the at least another connection serving for at least one of feeding and removing air.

In accordance with an additional feature of the invention, the laser weld seam is formed so as to start from the at least one rear element.

In accordance with yet another feature of the invention, the top plate has a greater thickness than that of the at least one rear element.

In accordance with yet a further feature of the invention, the thickness of the top plate is more than twice as great as that of the at least one rear element at the laser weld seam.

In accordance with yet an added feature of the invention, the top plate is of high-grade steel.

In accordance with yet an additional feature of the invention, the rear element has a substantially rectangular outline, in the vicinity of which the rear element is connected to the top plate, the rear element having elevations spaced from a rim of the rear element, said rear element being connected at the elevations to the top plate.

In accordance with still another feature of the invention, the depression in the top plate is rectangular and follows the outline of the rear plate.

In accordance with still a further feature of the invention, in portions extending transversely to the direction of travel of the sheet, the depression is subdivided into regions extending obliquely to the transverse direction.

In accordance with still an added feature of the invention, the elevations are of like size and are arranged regularly.

In accordance with still an additional feature of the invention, a plurality of the elevations are formed with openings.

In accordance with again another feature of the invention, the depressions in the top plate are formed as beads.

In accordance with again a further feature of the invention, the elevations are connected to the top plate by annular laser weld seams.

In accordance with again an added feature of the invention, a plurality of the elevations are connected to the top plate by interrupted laser weld seams.

In accordance with again an additional feature of the invention, the beads have a width which is greater than the width of a weld seam.

In accordance with another feature of the invention, the beads have a width which is much greater than twice as great as the width of a weld seam.

In accordance with a further feature of the invention, in regions wherein the rear element has openings, the top plate is provided with air nozzles aligned so as to produce an air flow directed at the sheet.

In accordance with an added feature of the invention, the air nozzles, respectively, are aligned obliquely with respect to the sheet travel.

In accordance with an additional feature of the invention, the air nozzles, respectively, are formed by a plate region which is partly cut free and bent away from the plane of the top plate.

In accordance with another aspect of the invention, there is provided a method for producing sheet guide plates, including forming depressions in a top plate in regions thereof which are intended to serve for connecting the top plate to a rear element at the rear of the top plate, forming connecting regions on the rear element, placing the top plate and the rear element on top of one another, and welding the rear element to the top plate by laser welding at the depressions, which comprises, in the top plate wherein a weld seam is created, forming the depression deeper than every deformation induced by the weld seam.

In accordance with a further mode, the method of the invention includes forming the weld seam by guiding the light beam of the laser on the rear element.

In accordance yet another feature of the device of the invention, the top plate has a polished surface with a surface quality corresponding to a 3D surface.

In accordance with yet a further feature of the device of the invention, the beads are annular beads.

In accordance with a concomitant feature of the invention, the laser weld seams are in a form selected from the group thereof consisting of spot and point forms.

Thus, the sheet guiding device according to the invention has a surface which makes it possible, even in regions wherein further elements are fastened onto the rear side thereof, for printed sheets to be guided on an air cushion from and to the guide plate without leaving ink on the guide plate. This is achieved by constructing the guide plate so that it is planar or curved only about one axis (cylinder portion), while it has depressions for forming laser weld seams.

The cooled sheet guiding device is essentially made up of a top plate and a rear plate, the top plate and the rear plate being laser-welded to one another. This ensures that a coolant space is formed between the top plate and the rear plate, the coolant present in the coolant space cooling the top plate directly, which makes high cooling capacities possible.

The top plate and the rear plate are connected to one another by laser weld seams when corresponding connecting regions are provided. These weld seams are arranged in depressions which are formed in the top plate on the smooth side thereof, the depressions being deeper than every deformation induced by the laser weld seam. A consequence thereof is that deformations, distortions, roughnesses and the like induced by the weld seam are accommodated by the corresponding depressions. Microscopic elevations or distortions caused by the weld seam consequently do not protrude out of the depressions and cannot touch a sheet running over the guiding plate. It has been found here that the depressions do not disturb an air cushion building up between the sheet and the guiding plate and do not cause any undesired turbulence even in the case of fast-running sheets. This is the case even if the irregularities or deviations from the ideal of the side of the top plate facing the sheet, which are formed by the depressions, are greater than the deviations induced by the weld seam.

The sheet guiding device according to the invention consequently makes high cooling capacities and high sheet running speeds possible with a simple, low-cost and material-saving construction. If a device for forming an air cushion between the sheets and the sheet guiding plate are provided, sheets printed on both sides (first-form or recto printing/perfector or verso printing or first-form or recto printing/first-form or recto printing) can be guided over the sheet guiding plate without depositing any ink on the sheet guide plate or damaging the print on the sheet. In addition, it has been found that, with the method for producing sheet guiding devices according to the invention, sheet guiding devices having a top plate which is virtually completely planar can be created. The thermal stresses and deformations occurring during the laser welding remain restricted to the region of the depressions formed, and do not distort the remaining surface of the top plate. Consequently, thin air cushions become possible, whereon the sheets are precisely guided without colliding with elevations of the sheet guide plate.

The laser weld seam is preferably formed from the rear side of the top plate. Consequently, during laser welding, the laser beam does not fall on the side of the sheet guiding device facing the sheet but on the elements welded onto the rear side, i.e., the rear plate, for example. Surface changes of the top plate showing on the smooth side of the top plate and attributable to the thermal exposure during the welding operation are restricted to the region of the depression and consequently do not impair the surface quality of the top plate in the regions which matter. For this purpose, the depression in the top plate is deeper than every deformation induced by the laser weld seam. The depth of the depression is in this case within the range of a few tenths of a millimeter, for example, 2/10 to 3/10 mm. This suffices for keeping thermal stresses away from the top plate which, for example, is formed much thicker than the rear plate. Also, as a result thereof, the thermal loading of the preferably highly polished front side of the top plate (3D surface) can be minimized.

For the connection between the top plate and the rear elements, one or more depressions may be provided, preferably formed as beads (annular beads). The width of these beads, in this case, preferably exceeds the width of a laser weld seam significantly. This keeps deformations induced by the laser weld seam away from the regions of the top plate lying outside the bead. It also gives rise to the possibility of reworking, i.e., when there are individual defects of the laser weld seam, a second weld seam can be set alongside the defective laser weld seam, the second weld seam not overlapping (crossing over) the defective weld seam and ultimately establishing the desired or fluidtight connection. The top plate may be provided with air nozzles, which are, for example, formed integrally on the top plate. This is accomplished by the top plate being provided with cuts or incisions, a region adjacent to the incision on one side being bent out towards the rear side. In this way, air nozzles which assume lifting and/or transporting functions can be formed.

This can be achieved by corresponding angling or angular adjustment of the air nozzles.

The rear plate is connected at the outer rim or border thereof to the top plate. In a corresponding manner, the bead formed for this purpose in the top plate is preferably substantially rectangular. In an advantageous embodiment, the portions of the bead extending transversely with respect to the running path of the sheet are arranged obliquely. For example, they follow a wavy line or a zigzag line. Collisions of the sheets running over them is consequently prevented.

Regularly arranged connecting locations between the top plate and the rear plate keep the top plate planar against the pressure of the cooling medium. The connecting locations are formed by, for example, cup-shaped elevations on the rear plate. The connection may be formed by an annular laser weld seam or one or more point- or spot-like welding locations.

Other features which are considered as characteristic for the invention are set forth in the appended claims.

Although the invention is illustrated and described herein as embodied in a sheet guiding device and method of production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENT

Figure 1:
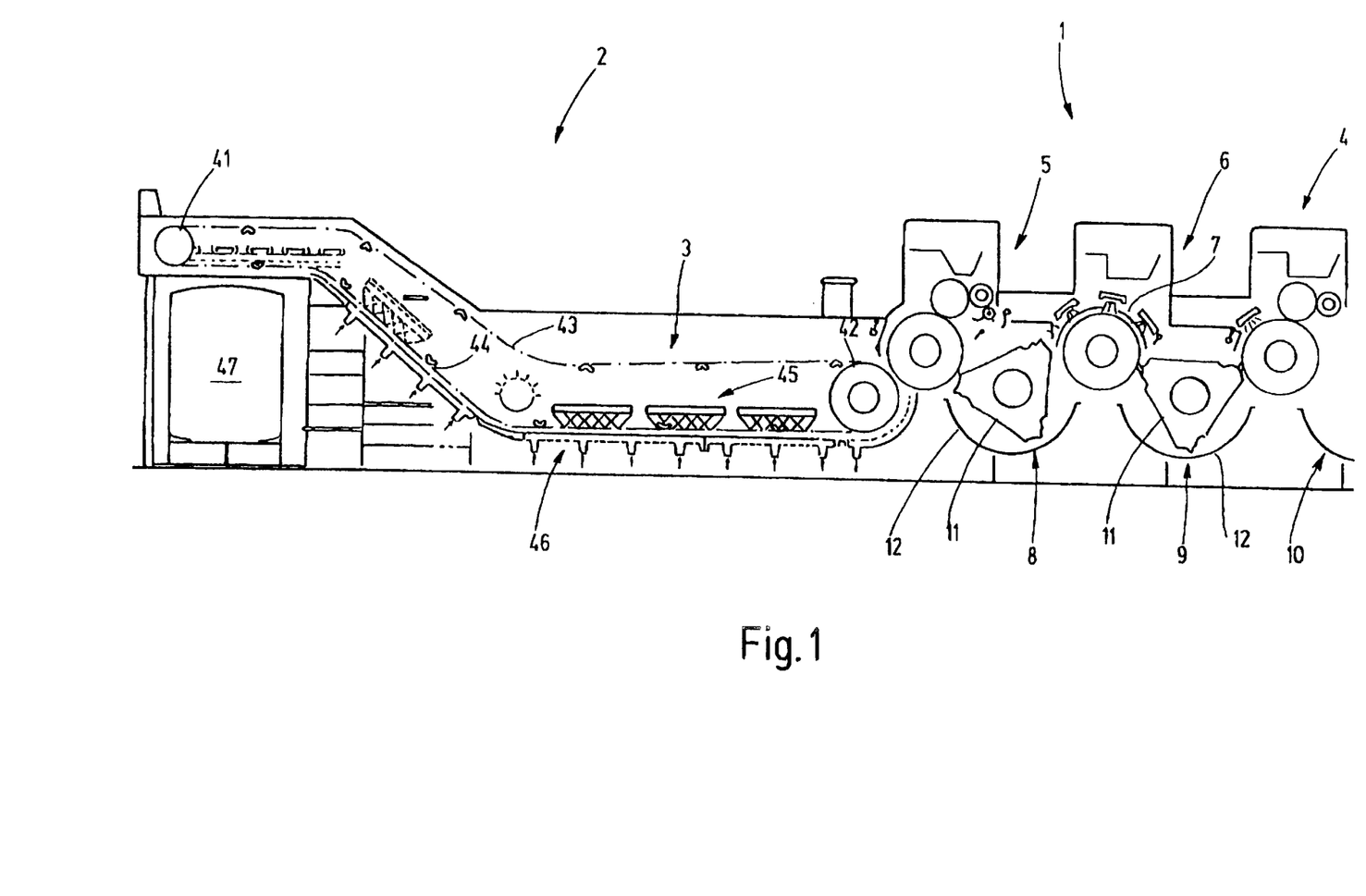
FIG. 1 is a diagrammatic longitudinal side elevational view of a sheet-fed offset printing machine with a dryer and a sheet delivery, incorporating the sheet guiding device according to the invention.

Referring now to the drawings and, first, particularly to FIG. 1 thereof, there is shown therein a sheet-fed offset printing machine 1, to which a sheet delivery 2 with a dryer 3 is connected. The sheet-fed offset printing machine 1 is illustrated merely by the last two varnishing units 4 and 5 thereof and an intermediate station 6, although it has further stations and elements arranged upline, in particular, a turning or reversing station, so that sheets 7 to be printed can be printed on front and rear sides thereof, respectively. Arranged between the individual stations 4, 6 and 5, respectively, and further non-illustrated stations are respective transfer boxes 8, 9, 10, each of which has an associated transfer member 11 (sheet transferring device) and a transfer plate 12. The transfer member 11 is made-ready or set up for seizing or gripping the sheet at the leading edge thereof and transporting it to the next roller, respectively. The transfer plate 12 prevents the sheet from being propelled away from the transfer member 11 as a result of the centrifugal force occurring at high rotational speeds.

Figure 6:
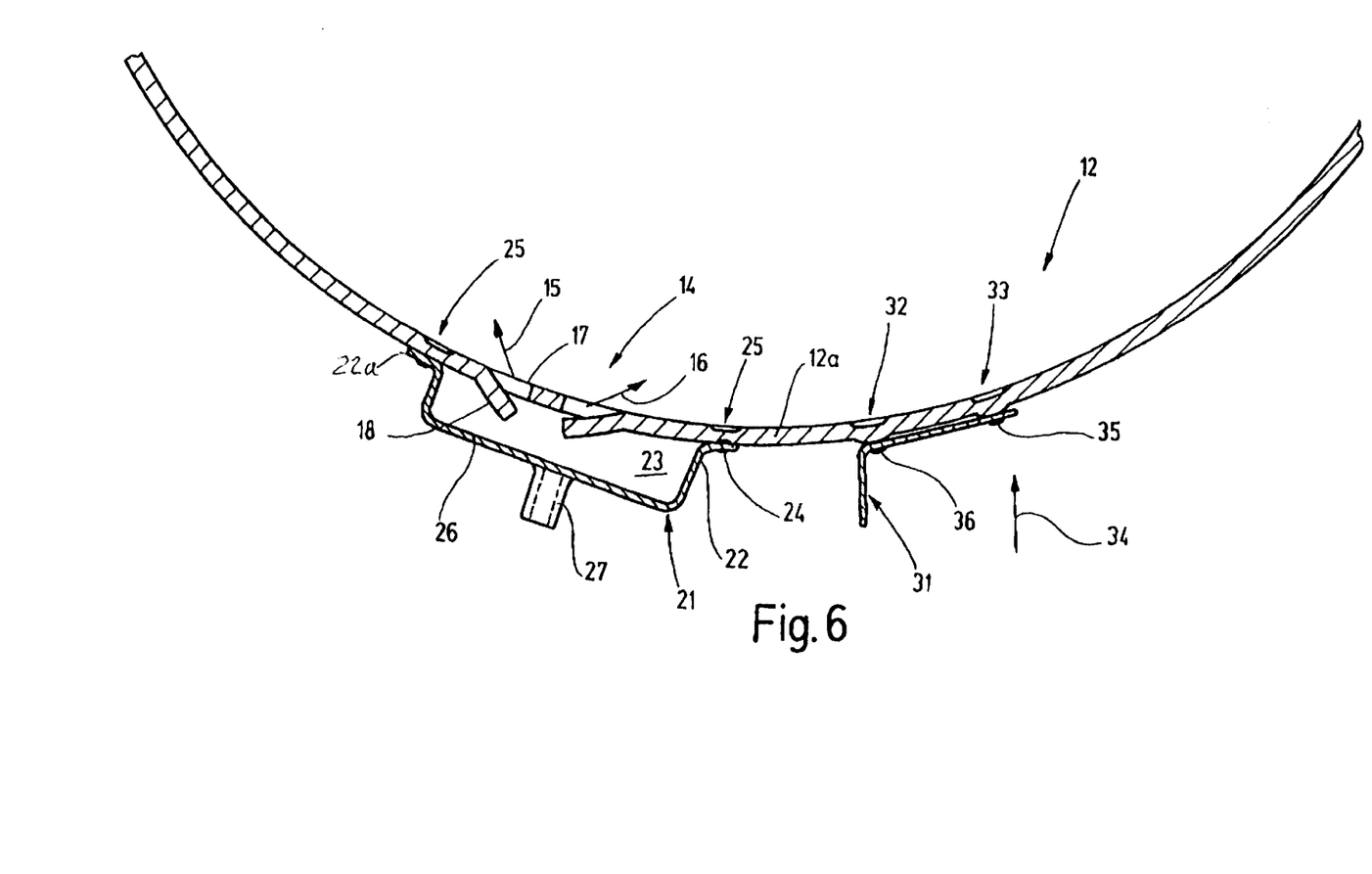
FIG. 6 is a fragmentary diagrammatic sectional view of FIG. 1 showing in greater detail one of the transfer or guide plates 12 according to the invention.

The transfer plate 12 is illustrated separately in FIG. 6. It may be formed with a single wall or double wall. On the side thereof lying radially inwardly and facing towards the sheet, which is not otherwise illustrated in FIG. 6, the transfer plate 12, which is formed of 1 to 2 mm thick high-grade steel, has a highly polished surface. For forming an air cushion between the transfer plate 12 and the sheet pressed onto or against the transfer plate 12 by centrifugal force, the transfer plate 12 may be provided with air nozzles 14, from which air leaves in the direction of the arrows 15 and 16 for forming an air cushion. The air nozzles 14 are formed, for example, by a cut 17, from which a pocket 18 is bent radially outwardly away.

Overlapping or crossing over the air nozzles 14, an air box 21 is welded onto the transfer plate 12 from the outer side thereof. The air box 21 may in this case be formed over part or the entire width of the transfer plate 12 (perpendicularly to the plane of the drawing) and, with respect to the direction of movement of the sheet, over the entire length of the transfer plate 12 or, as represented, merely over part thereof. The air box 21 has a rim 22, a free end 22a of which bears flat against the rear side of the transfer plate 12. Serving for sealing off from the outside the inner space 23 defined by the air box 21, and for fastening the air box 21 are laser weld seams 24, which run along the air box 21 around the entire border 22 of the air box 21. In the region of the laser weld seam 24 and rim 22, the transfer plate 12 is formed with an annular bead or corrugation 25, which is, for example, 2/10 mm deep. The laser weld seam 24, in this regard, is arranged on the outer side of the transfer plate 12 opposite the annular bead 25.

In the production of the transfer plate 12, the following procedure is followed:

Initially, a top plate 12a in sheet form is made ready, an annular bead 25 being embossed on the polished inner side thereof. For producing the air cushion 21, a corresponding rear plate 26 is pre-bent and provided with a connection 27 for feeding air to the inner space 23. In particular, however, the rim 22, 22a is bent. For connecting the rear plate 26 to the top plate 12a, the rear plate 26 is placed with the rim thereof 22, 22a radially from the outside against the top plate 12a so that the annular bead 25 coincides with the rim 22. In a next working step, a laser beam is directed from the radially outer side, with respect to the curvature of the transfer plate 12, onto the rim 22, 22a in the region of the laser weld seam 24 to be formed, and is guided along the rim region 25. The heating which occurs as this takes place is so intense that the heat penetrates into the region of the annular bead 25 and welds the top plate 12a to the rear plate 26. However, the annular bead 25, the depth of which is much less than the thickness of the top plate 12a (1 to 2 mm), keeps thermal stresses occurring away from the polished surface (inner side) of the top plate 12a.

In a similar way, a securing member or holder 31, for example, may be applied to the top plate 12a. However, individual depressions 32 and 33 which are formed in the top plate 12a from the inner side, i.e. the side facing the sheet, are sufficient here instead of the annular bead 25. The securing member 31, which may be formed, for example, by a sheet-metal angle, the thickness of the sheetmetal being preferably much less than that of the top plate 12a but, if need be, being also greater, is then heated in the region of the depressions 32 and 33 by a laser from the rear side (arrow 34) in a manner that weld locations 35 and 36 are formed. The micro-deformations of the surface of the top plate 12a originating or emanating from these locations lie in the vicinity of the depressions 32 and 33 and consequently do not disturb the surface of the top plate 12a.

The delivery 2 illustrated in FIG. 1 has a chain 43 which is guided around rollers 41 and 42 and has grippers 44 for the sheet transport. The sheets are in this case transported through the dryer 3 wherein, for example, a number of infrared radiators 45 are arranged for drying the sheets. Located opposite the infrared radiators 45 are water-cooled sheet guiding devices. These serve the purpose of guiding the sheets contact-free as far as possible on a predetermined path through the dryer 3, before the sheets are stacked on a sheet pile 47.

Figure 2:
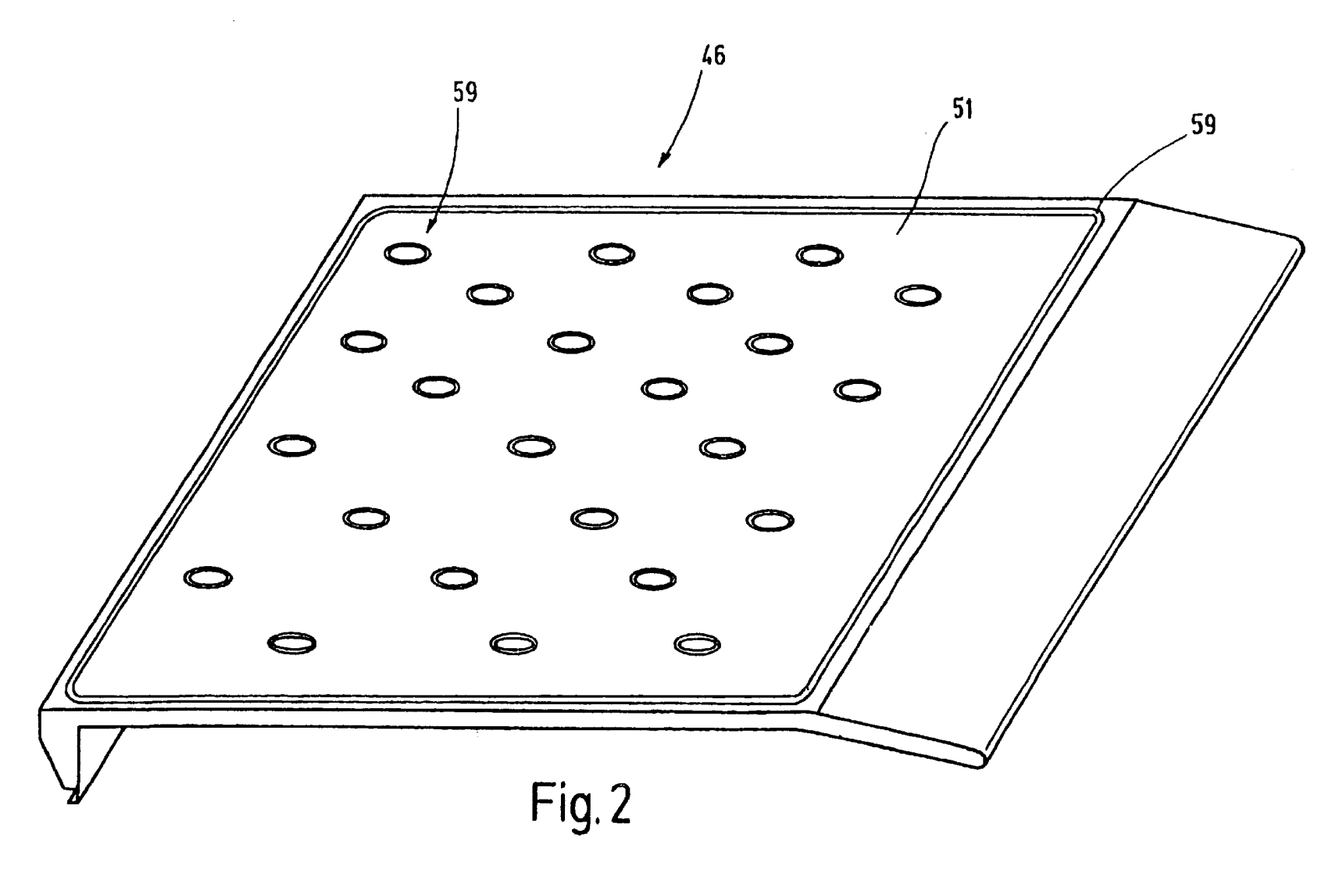
FIG. 2 is an enlarged fragmentary view of FIG. 1 showing, in a top, side and front end perspective view, a sheet guide plate of the sheet guiding device disposed in the dryer of the printing machine.
Figure 3:
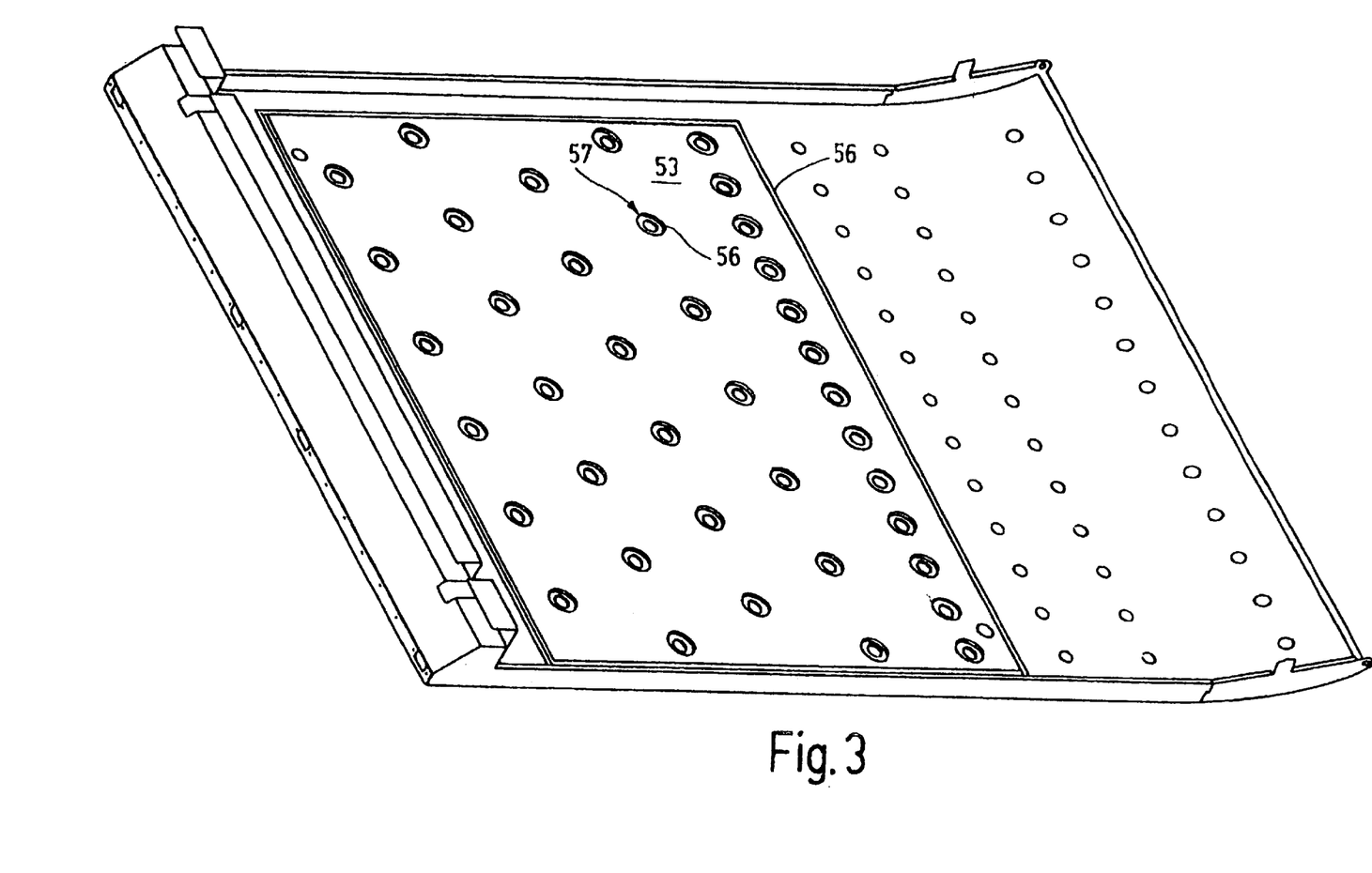
FIG. 3 is a perspective bottom, side and rear end view of the shows the sheet guide plate according to FIG. 2.

The sheet guiding device 46 is illustrated separately in FIG. 2. It has an essentially planar top plate 51, on the essentially planar upper side of which air nozzles 52 are arranged. The air nozzles 52 have been omitted from FIGS. 2 and 3 in the interest of overall clarity, but can be seen in FIG. 4. The top plate 51 is produced from high-grade steel and has a highly polished surface. The air nozzles 52 are aligned in such a way that they raise a sheet guided over the top plate 51 and draw it smooth in the lateral direction. For this purpose, the air nozzles 52 are, for example, arranged in respective groups of three in such a way that the blowing directions thereof, aligned at an acute angle with respect to the sheet or the upper side of the top plate 51, define a triangle. Other air nozzles are individually arranged so that they transport the sheet laterally outwardly and forwardly.

This produces a smooth-drawing or pulling effect upon the sheet.

The top plate 51 of the sheet guiding device 46 is, for example, water-cooled. For this purpose, as FIGS. 3 and 4 reveal, the sheet guiding device 26 is connected at the underside thereof, i.e., at the side thereof facing away from the sheet, to a rear plate 53, with the formation of one or more coolant chambers 54. While the relatively thick, i.e., approximately 1.5 mm thick, top plate 51 is of a planar form, bent-up rims 56 are provided on the comparatively thinner rear plate 53, producing a spacing between the remainder of the rear plate 53 and the top plate 51. The upwardly bent rims 56 are provided both at the outer periphery of the rear plate 53 and where there are openings 57 which, for example, permit access to the air nozzles 52 (on the lefthand side of FIG. 4) or serve only for the fastening of the rear plate 53 on the top plate 51 over the surface area (on the righthand side of FIG. 4), in order to prevent upward curvatures of the rear plate 53 due to coolant pressure. The rear plate 53 has, at the rim 56 thereof, a portion 56a which extends parallel to the surface of the top plate 51. This region defines a connecting region wherein there is formed a laser weld seam 58 for the connection to the top plate 51. The laser weld seam 58 in this case engages the top plate 51 in the region of bead-like depressions 59, which are accommodated in the top plate 51 and are represented separately in FIG. 5. The bead-like depression 59 has a depth which is much less than the thickness of the top plate 51. It preferably lies in the range of from 1/100 to 3/100 mm. A given projection 61 may form on the rear side of the top plate 51 during the forming of the bead 59, which may for example be 2 to 4 mm wide, during the embossing of the bead 59. During production of the laser weld seam 58, the rear plate 53 is subjected, in the connecting region 56a, to a laser beam, so that the seam (laser weld seam 58) represented in FIG. 5 by broken lines is obtained. During the formation of this seam, regions of the top plate 51 are also heated, but lie completely in the region of the bead 59. Occurring surface roughnesses 63 or distortions 64 therefore remain restricted to the region of the bead 59 and do not disturb the remaining surface of the top plate 51. The bead 59 is accordingly dimensioned so that permanent thermal changes of the top plate 51 emanating from the rear side due to the laser welding are restricted to a region lying within the bead 59. This applies both with regard to the depth of the bead 51 and with regard to the width thereof.

Figure 4:
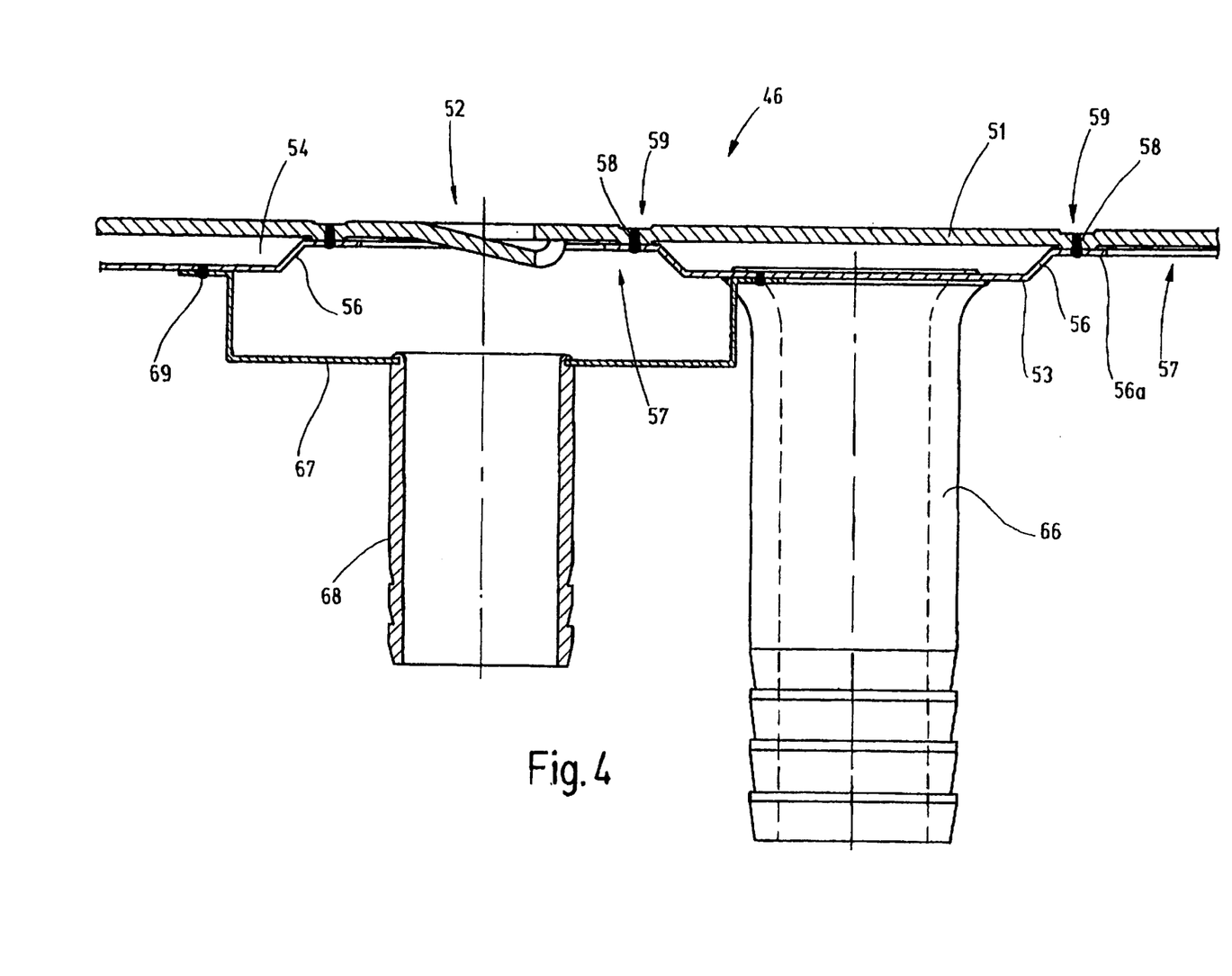
FIG. 4 is an enlarged fragmentary longitudinal sectional view of FIG. 2, showing the sheet guide plate in greater detail.
Figure 5:
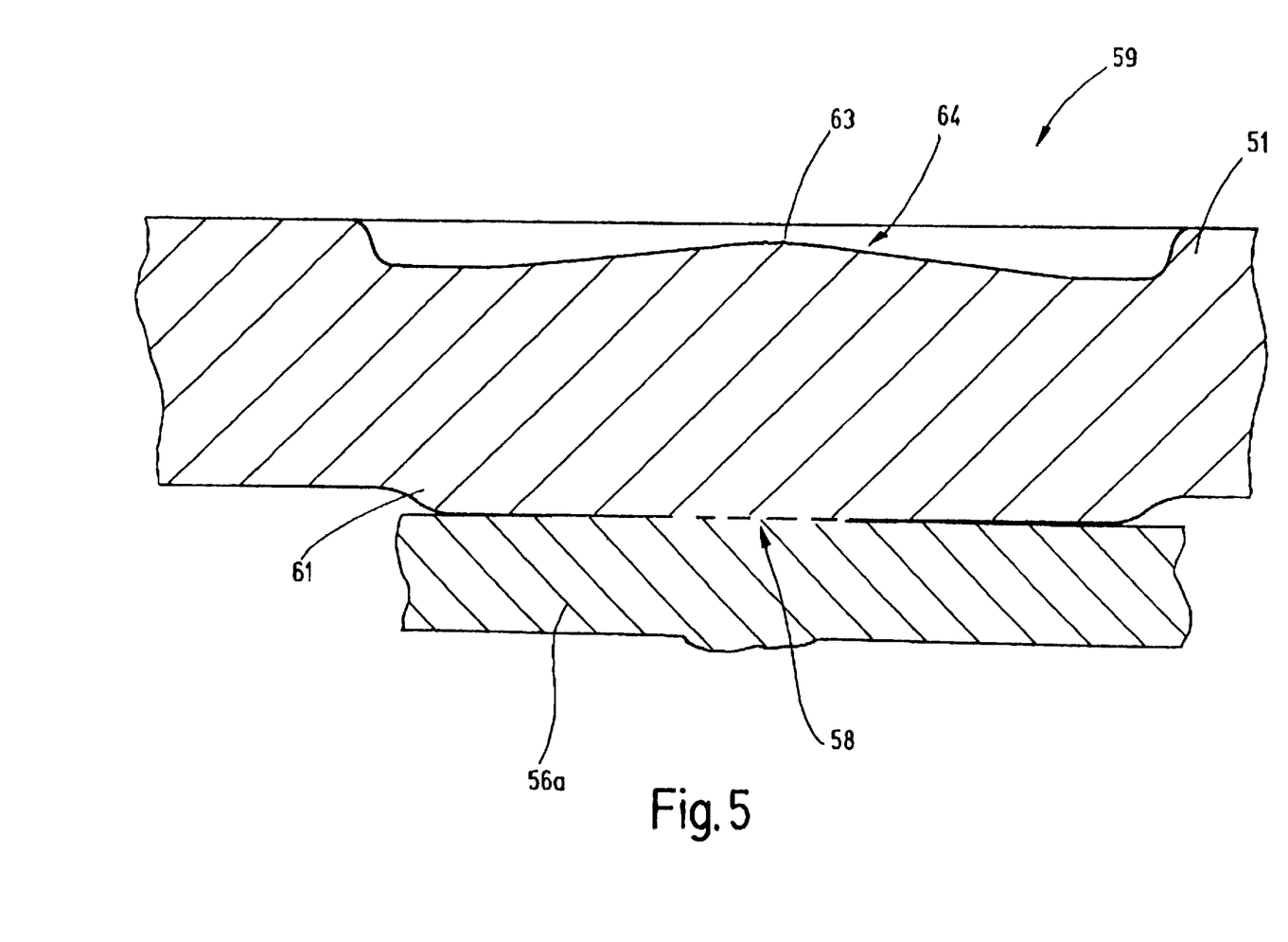
FIG. 5 is a further enlarged fragmentary longitudinal sectional view of FIG. 4, showing the sheet guide plate in even greater detail, including the welded connection between the top plate and the rear plate thereof.

On the rear plate 53, there may be provided, likewise by laser welding, a connecting piece 66 for supplying cooling water and, if need be, a further connecting piece for the removal of cooling water. Furthermore, an air box 67 with air connecting pieces 68 may be arranged in the region of the air nozzle 52 and the opening 57. The air box 67 serves for feeding blowing air to the air nozzles 52 in order to form an air cushion between the sheet and the top plate 51. The air box 67 may be connected by the laser weld seam 69 to the rear plate 53 or, if need be, also directly to the top plate 51.

The sheet guide plate 46 described hereinbefore is produced as follows:

To make-ready the connection to the rear plate 51, the correspondingly made-ready top plate 51 initially receives the beads 59 in an embossing operation. In this case, as can be seen from FIG. 2, a bead 59 is embossed virtually at right angles in a region at which the outer rim or border of the rear plate 53 is later to be fastened. At the same time or in a working step arranged before or after, a multiplicity of annular beads or, if need be, even simple depressions are formed in the surface of the top plate 51, in order to establish intermediate fastenings with respect to the rear plate 53.

Before connecting to the top plate 51, the rear plate 53 is provided with the rim or border 56/56a thereof in one or more working steps. The rear plate 53 is thereafter placed against the rear side of the top plate 51. The connection is established by laser welding, the laser beam being guided along on the rear plate 53 and the connecting region 56a of the latter, respectively. The heating up of the top plate 51 is thereby kept within limits. Furthermore, the laser weld seam 58 is arranged exclusively at the regions of the top plate 51 lying opposite the beads 59.

Provided in particular for printing machines or downline devices are sheet guiding devices 46, on the rear side of which further parts are arranged, for example a rear plate 53 for the formation of coolant channels 54 for cooling the top plate 51. Serving for connection purposes, laser weld seams 59 are provided, which are arranged exclusively in the vicinity of the beads 59 or other depressions, at least as far as the smooth upper side of the top plate 51 is concerned. Thermal influences during the production of the laser weld seam 58 are consequently isolated from the remaining surface of the top plate 51.

I claim:

1. A sheet guiding device having a top plate formed with a smooth side facing towards sheets to be guided past the device, comprising at least one depression defining at least one connecting region, said at least one depression being formed in the top plate from the smooth side thereof, and at least one rear element fastened to a rear side of the top plate and having at least one connecting portion assigned to said at least one connecting region, said at least one rear element bearing against the top plate and being connected thereto by laser weld seams forming a connection to the top plate at said at least one connecting region defined by said at least one depression, said at least one depression formed in the top plate being deeper than any deformation induced by the laser weld seams.

2. The sheet guiding device according to claim 1, wherein said at least one rear element is a further plate whereon said at least one connecting portion assigned to said at least one connecting region is formed, and including a fluid chamber formed between the top plate and said further plate, and being accessible via at least another connection.

3. The sheet guiding device according to claim 2, wherein said fluid chamber is a coolant chamber having an inlet connection and an outlet connection and, therefrom, the top plate being, from the rear side thereof, in direct heat exchange with the coolant.

4. The sheet guiding device according to claim 2, wherein said fluid chamber is an air chamber, and said at least another connection serving for at least one of feeding and removing air.

5. The sheet guiding device according to claim 1, wherein said laser weld seam is formed so as to start from said at least one rear element.

6. The sheet guiding device according to claim 1, wherein the top plate has a greater thickness than that of said at least one rear element.

7. The sheet guiding device according to claim 6, wherein said thickness of the top plate is more than twice as great as that of said at least one rear element at said laser weld seam.

8. The sheet guiding device according to claim 1, wherein the top plate is of high-grade steel.

9. The sheet guiding device according to claim 8, wherein the top plate has a polished surface with a surface quality corresponding to a 3D surface.

10. The sheet guiding device according to claim 1, wherein said rear element has a substantially rectangular outline, in the vicinity of which the rear element is connected to the top plate, said rear element having elevations spaced from a rim of said rear element, said rear element being connected at said elevations to the top plate.

11. The sheet guiding device according to claim 10, wherein said depression in the top plate is rectangular and follows the outline of said rear plate.

12. The sheet guiding device according to claim 10, wherein, in portions extending transversely to the direction of travel of the sheet, said depression is subdivided into regions extending obliquely to the transverse direction.

13. The sheet guiding device according to claim 10, wherein said elevations are of like size and are arranged regularly.

14. The sheet guiding device according to claim 13, wherein a plurality of said elevations are formed with openings.

15. The sheet guiding device according to claim 14, wherein, in regions wherein said rear element has openings, the top plate is provided with air nozzles aligned so as to produce an air flow directed at the sheet.

16. The sheet guiding device according to claim 15, wherein said air nozzles, respectively, are aligned obliquely with respect to the sheet travel.

17. The sheet guiding device according to claim 15, wherein said air nozzles, respectively, are formed by a plate region which is partly cut free and bent away from the plane of the top plate.

18. The sheet guiding device according to claim 10, wherein a plurality of said elevations are connected to the top plate by interrupted laser weld seams.

19. The sheet guiding device according to claim 18, wherein said laser weld seams are in a form selected from the group thereof consisting of spot and point forms.

20. The sheet guiding device according to claim 1, wherein said depressions in the top plate are formed as beads.

21. The sheet guiding device according to claim 20, wherein said elevations are connected to the top plate by annular laser weld seams.

22. The sheet guiding device according to claim 20, wherein said beads have a width which is grater than the width of a weld seam.

23. The sheet guiding device according to claim 20, wherein said beads have a width which is much greater than twice as great as the width of a weld seam.

24. The sheet guiding device according to claim 20, wherein said beads are annular beads.

25. A method for producing sheet guide plates, including forming depressions in a top plate in regions thereof which are intended to serve for connecting the top plate to a rear element at the rear of the top plate, forming connecting regions on the rear element, placing the top plate and the rear element on top of one another, and welding the rear element to the top plate by laser welding at the depressions, which comprises, in the top plate wherein a weld seam is created, forming the depression deeper than every deformation induced by the weld seam.

26. The method according to claim 22, which includes forming the weld seam by guiding the light beam of the laser on the rear element.

* * * * *